Nov. 8, 1966   T. E. BELSHAW ETAL   3,283,695
DOUGHNUT FRYING MACHINE

Filed Aug. 19, 1963   5 Sheets-Sheet 1

THOMAS E. BELSHAW
WILBUR D. WILKE
GLENDON H. SCOTT
INVENTORS.

BY Seed & Berry
ATTORNEYS

Nov. 8, 1966  T. E. BELSHAW ETAL  3,283,695
DOUGHNUT FRYING MACHINE
Filed Aug. 19, 1963  5 Sheets-Sheet 4

THOMAS E. BELSHAW
WILBUR D. WILKE
GLENDON H. SCOTT
INVENTORS

BY Seed & Berry
ATTORNEYS

Nov. 8, 1966    T. E. BELSHAW ETAL    3,283,695
DOUGHNUT FRYING MACHINE
Filed Aug. 19, 1963    5 Sheets-Sheet 5

THOMAS E. BELSHAW    INVENTORS.
WILBUR D. WILKE    GLENDON H. SCOTT
BY Seed & Berry
ATTORNEYS

United States Patent Office

3,283,695
Patented Nov. 8, 1966

3,283,695
DOUGHNUT FRYING MACHINE
Thomas E. Belshaw, Wilbur D. Wilke, and Glendon H. Scott, Seattle, Wash., assignors to Belshaw Brothers Incorporated, Seattle, Wash., a corporation of Washington
Filed Aug. 19, 1963, Ser. No. 302,894
17 Claims. (Cl. 99—354)

This invention relates generally to cooking machines of the type in which bodies to be cooked are fed into a tank of hot cooking liquid and are conveyed through the tank as they cook, and more particularly to automatic doughnut frying machines in which dough rings are cut and dispensed at predetermined intervals into hot fat or oil, are conveyed therethrough while frying, and are then discharged.

An important object of the present invention is to provide a practical such machine in which the frying dough bodies are automatically turned end for end part way along their travel through the hot fat and after frying of both sides is completed are automatically drained and conveyed out of the tank.

A further object is to provide a doughnut frying machine which can be easily assembled and disassembled for cleaning and has a dough cutter-dispenser which can be readily removed without disturbing the rest of the mechanism.

The invention also aims to provide a doughnut frying machine having a dough cutter which automatically swings from side to side dispensing multiple dough rings in laterally spaced relation between the flights of a constantly advancing flight conveyor operating therebeneath.

Another object is to provide a doughnut frying machine having a self-driven dough cutter which is timed without use of mechanical linkage to properly dispense dough rings relative to a constantly moving conveyor driven by a different power unit than that for the cutter.

Still another object is to provide a doughnut frying machine having a dough turner which is powered by the flights of a flight conveyor used to convey dough rings while they are frying.

Yet another object is to provide a doughnut frying machine having a dough turner of the type described which is easily removable without complete disassembly of the machine.

An additional object is to provide a mechanism for conveying doughnuts while they are frying which takes into account lack of initial buoyancy of the doughnut when first introduced to the fryer.

The invention further aims to provide an automatic doughnut frying machine which is not damaged if the mechanism becomes jammed and which automatically sounds a warning in such an instance.

Other more particular objects and advantages of the invention will, with the foregoing, appear and be understood in the course of the following description and claims, the invention consisting in the novel costructon and in the adaptation and combination of parts hereinafter described and claimed.

Referring to the drawings it is seen that in general the illustrated embodiment of the invention has a tank assembly comprising a rectangular base frame 20 in which is seated a removable fryer tank 21 for holding fat and having a removable heating assembly 22 for the fat. A detachable motor-driven dough cutter 23 is swingably mounted at the rear of the base frame and is timed for dispensing dough charges into the tank, alternately from side to side. These dough charges are carried forwardly in the hot fat, turned over about half way through their travel, and discharged at the front of the tank by a removable conveyor unit 24 which includes a cooking flight conveyor 25, a turner 26, and a drain conveyor 27. The conveyor unit is detachably coupled to a drive unit 28 in turn mounted on the base frame 20 near the front.

Continuing to a detailed description of these various components of the fryer, the base frame 20 is a tank-like outer case open at the top to receive the tank 21 which has an out-turned marginal lip 21a resting on the top of the frame. At the corners the base frame has exterior stiffening angles 30 and bottom pads 31 from which depend legs 32 with adjustable leveling feet 33. The left front angle has the drive unit 28 mounted thereon while the right rear angle is formed with a vertically spaced pair of back eye extensions 34 providing a turn socket for the base of the column 35. This column has an adjustable collar 36 resting on the upper extension and at its upper end has an adapter sleeve 37 with an upstanding non-circular pin 38 for receiving a mating eye presented by a rim piece 40 on the hopper 41 of the dough cutter 23.

Figure 1:
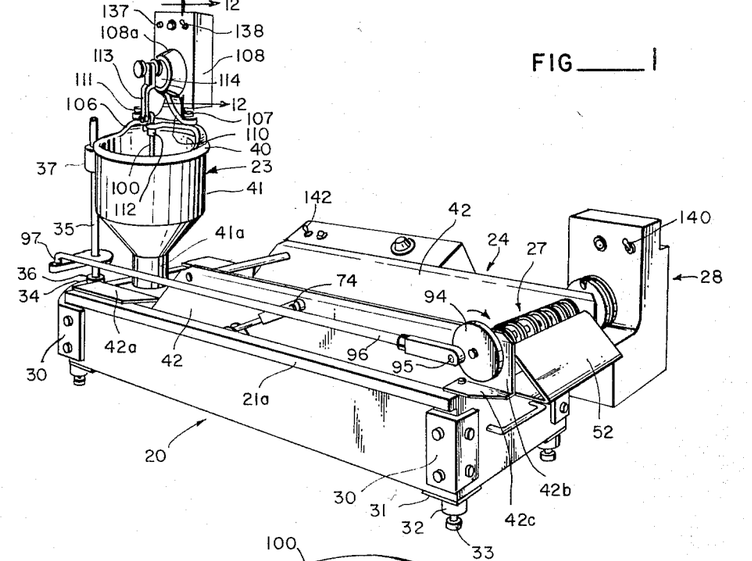
FIG. 1 is a perspective view of a frying machine embodying the present invention.
Figure 2:
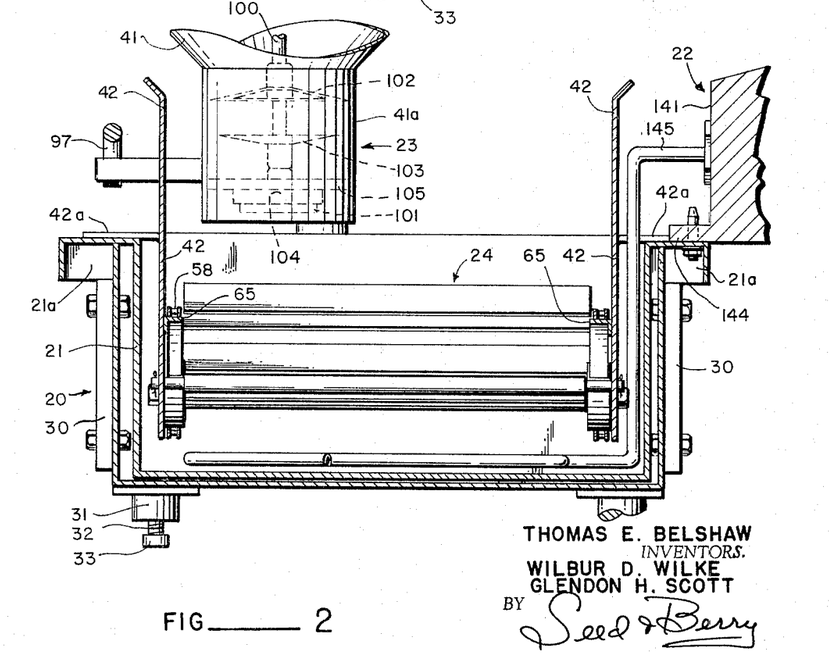
FIG. 2 is a transverse vertical sectional taken on line 2—2 of FIG. 3.

The conveyor unit 24 has a pair of longitudinal upright cheek plates 42—42 which have upper rear portions bent laterally out to form back support flanges 42a, and at the front the cheek plates have forward extensions 42b formed by cutouts at the lower front corners of the plates. It will be noted that the material from the upper portion of these cutouts is bent outwardly along the lower edge of the extensions 42b thereby forming flanges 42c coplanar with the flanges 42a. As can be seen in FIG. 1, the flanges 42a and 42c seat on the tank lip 21a to support the cheek plates in inwardly spaced relation from the longitudinal side walls of the tank and spaced above the bottom of the tank.

Journaled in bushings 43 in the extensions 42b is a front shaft 44 driving a plurality of sprockets 45 in the drain conveyor 27. These sprockets in turn drive a set of chains 46 which pass over a dead shaft 48. Bolts 49 pass through the cheek plates into the ends of the shaft 48 to hold it in parallel relation to the front shaft at a level beneath the surface of the fat in the tank 21. The upper conveying course of the chains 46 passes upwardly over a sloped ramp 50 which is looped at its upper and lower ends around cross-rods 51a and 51b traversing the space between the cheek plates. A third cross-rod 51c at the extreme front of the cheek plate extensions 42b has looped therearound the upper end of a discharge ramp 52 which has a horizontal extension 52a at its lower end bearing against the front of the tank frame 20.

Outwardly of the left cheek plate the front shaft 44 has a sprocket 53 which drives, via a chain 54 and complementing sprocket 55, the drive shaft 56 for the flight conveyor 25. This shaft 56 is also journaled in the cheek plates and it drives a pair of drive sprockets 57 for a pair of chains 58 which are cross-connected by flights 59 at regular intervals. At the rear these chains 58 pass over idler rollers 60 (FIG. 5) journaled on a dead shaft 61 in turn secured at its ends to the cheek plates by bolts 62. A submerged shelf 63 is looped at the rear about the shaft 61 between the idler rollers 60 and is supported at its forward end by a cross-rod 64. The shelf 63 is provided with a plurality of spaced elongated slots 63a, grouped in the center of the shelf and extending longitudinally thereof for a purpose later to be explained in connection with the operation of the invention. Of importance also is the fact that the chains 58 track over parallel rails 65 which are mounted on the inner opposed faces of the cheek plates and guide the upper course of the chains in an upward slope 65a from the rear shaft 61 and then horizontally at 65b to the sprockets 57.

Figures 3, 15:
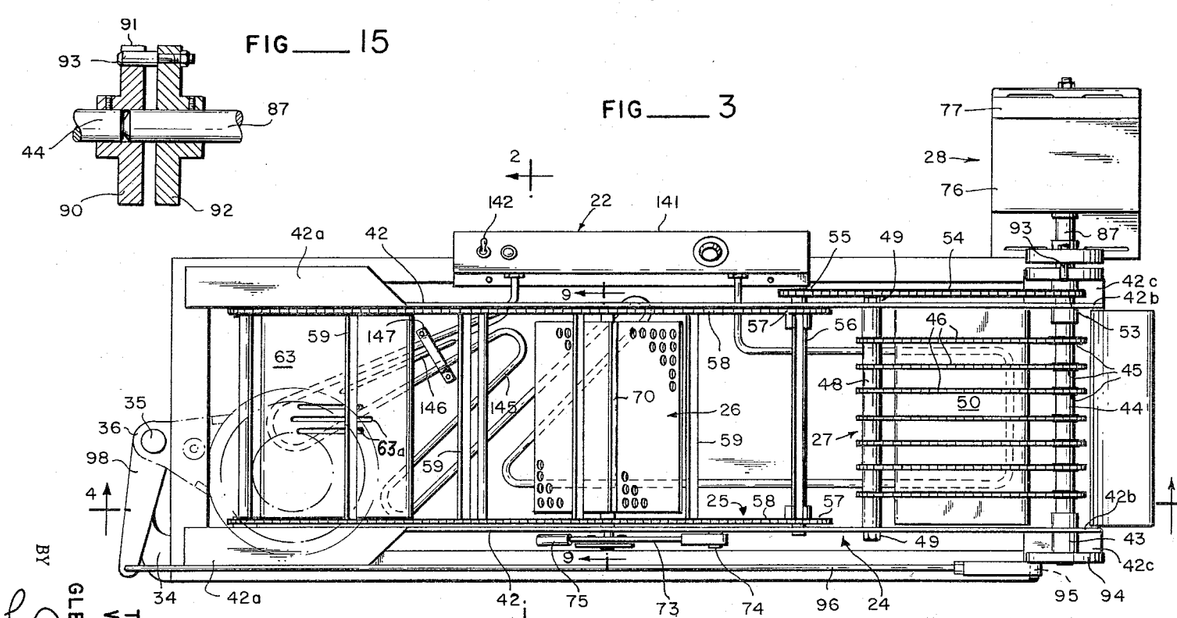
FIG. 3 is a top plan view of the frying machine.
FIG. 15 is a detail sectional view taken as indicated by line 15—15 in FIG. 4.
Figures 4, 5, 18:
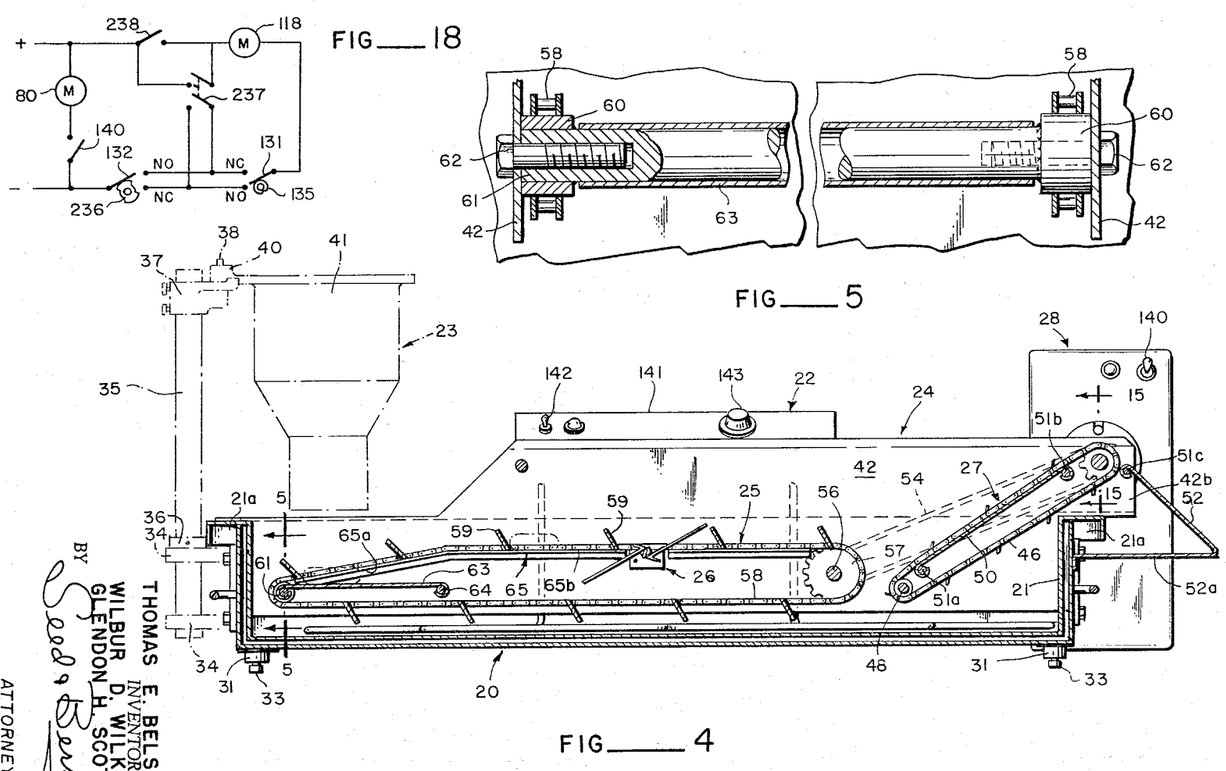
FIG. 4 is a longitudinal vertical sectional view taken on line 4—4 of FIG. 3.
FIG. 5 is a detail fragmentary view taken as indicated by line 5—5 of FIG. 4.
FIG. 18 is a schematic of an alternate electrical control circuit for the fryer.

Approximately midway along the horizontal portion 65b of their travel in the upper course the flights 59 operate the turner 26, the general positioning of which is illustrated clearly in FIGS. 3 and 4. Reference is now made to FIGS. 8, 8A, 8B and 9 which show the details of structure and mode of operation of the turner mechanism 26.

Figure 8:
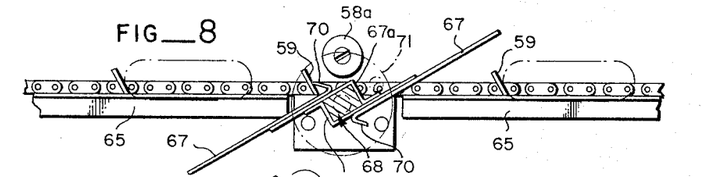
FIGS. 8, 8A and 8B are detail side elevational views showing various stages of operation in the doughnut turning cycle.
Figure 8A:
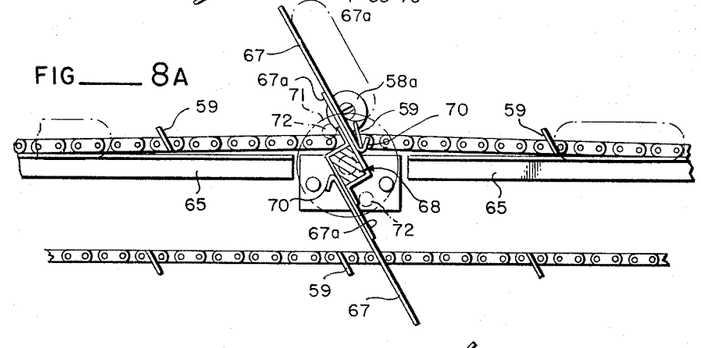
Figure 8B:
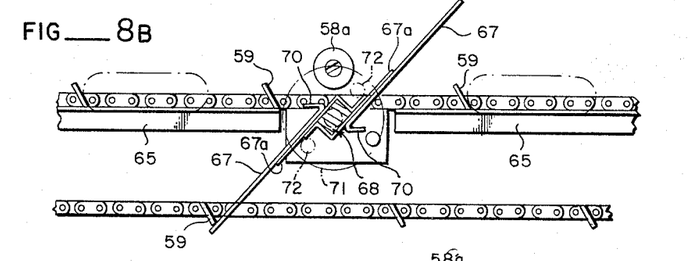

The turner 26 comprises a pair of oppositely extending flipper arms 67 which are connected to rotate with a square shaft indicated generally at 68. The flipper arms 67 are welded or otherwise rigidly fixed to a pair of offset angled plates 67a which are suitable joined, as illustrated in FIGS. 8, 8A and 8B, to form a square sleeve for the reception of the square shaft 68. The square shaft 68 is constructed of two separate members 68a and 68b for a purpose later to be explained. The root or secured ends of the flipper arms 67 have respective legs 70 extending in opposite directions at identical acute angles with respect to the planes of the respective flipper arms for engagement by the flights 59.

Figure 9:
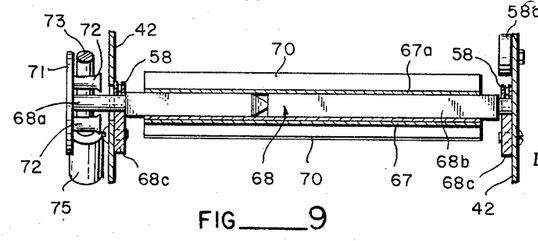
FIG. 9 is a detailed fragmentary view taken as indicated by line 9—9 of FIG. 3.
Figure 10:
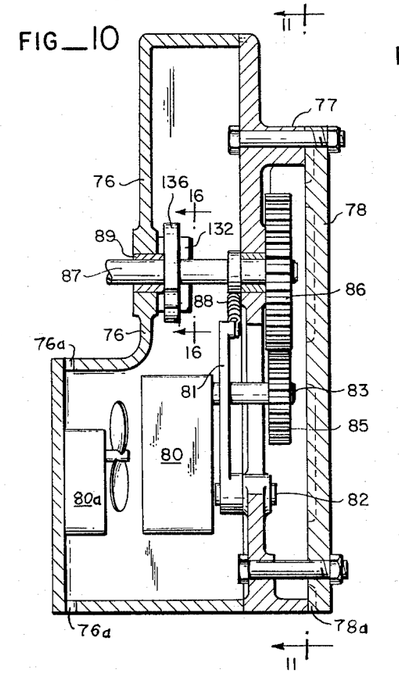
FIG. 10 is a vertical sectional view through the case of the drive unit.
Figure 11:
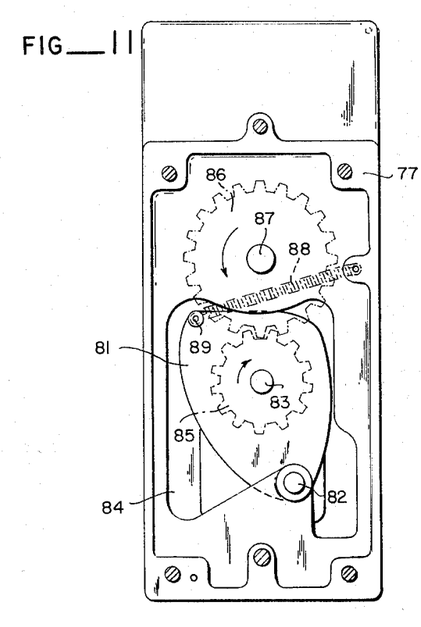
FIG. 11 is a vertical sectional view taken as indicated by line 11—11 in FIG. 10.
Figure 12:
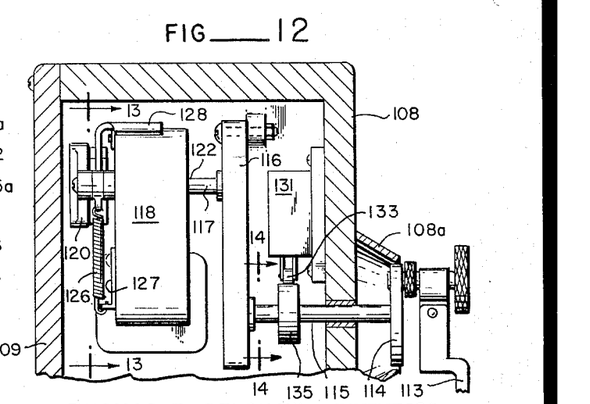
FIG. 12 is an enlarged fragmentary vertical sectional view taken as indicated by line 12—12 in FIG. 1.
Figure 13:
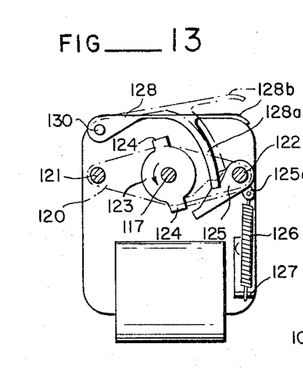
FIGS. 13 and 14 are detail sectional views taken on lines 13—13 and 14—14, respectively, of FIG. 12.

The shaft 68 is mounted for rotation between the cheek plates 42, is illustrated in FIG. 9, and is journaled in suitable support blocks 68c secured to the inner walls of the plates. As previously pointed out, the shaft 68 comprises two members 68a and 68b which are received within the sleeve provided by the angled plates 67a. The member 68a has a reduced diameter end portion resting on one support block 68c and extends through cheek plate 42. The member 68b also has a reduced diameter end portion which rests on the other support block 68c. It will also be noted that the opening in cheek plate 42 through which the member 68a extends is of sufficient size to permit the entire body of the member 68a to be removed for disassembly of the turner unit. When the shaft 68 is in operating position as illustrated the chains 58 of the conveyor 25 pass over the reduced diameter ends thereof with stop elements 58a being mounted above the chain on one of the cheek plates for the purpose of limiting the displacement of the chain in a vertical direction. The stop element is utilized because the chain normally tends to rise above the rails 65 when a flight engages leg 70 of one of the flipper arms 67. This action is illustrated clearly in FIG. 8A.

Figure 6:
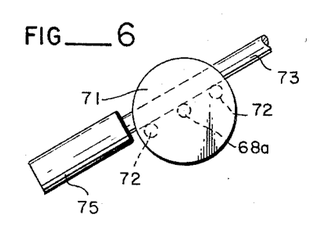
FIGS. 6 and 7 are detail side elevational views illustrating sequential positions of the swing arm and trundle heads of the turner mechanism.
Figure 7:
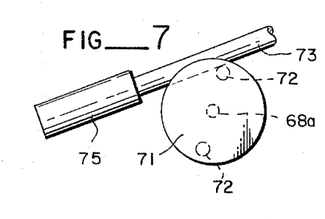

The end of the member 68a is connected to a trundle head 71 which is provided at diametrically opposite points with a pair of trundles 72 for engagement by a sloping swing arm 73, as illustrated in FIGS. 6–7. The arm 73 has its forward end pivotally mounted at 74 to the adjacent cheek plate and has its rear end fitted with a counter-weight 75.

The turner has half-turn cycles and is rotated by the action of the next approaching flight 59 and the action of the weighted arm 73 on the trundles 72. An understanding of the motion of the turner is best gained by reference to the sequence of positions shown in FIGS. 8, 8A and 8B. At the start of the motion, the turner is in the position shown in FIG. 8 with the lower flipper arm shown having cleared the flights on the lower run of the chains 58. At this point the trundles 72 are in the position shown in FIG. 6 with the weighted arm 73 maintaining their position. As the next approaching flight 59 contacts the back of the leg 70 the flipper arms and the trundle head are moved progressively by the flight to the position shown in FIG. 8A with the stop element 58a serving to prevent the chain from rising to allow the flight to skip over the leg 70. As illustrated, this action lifts the doughnut in a manner to flip it over end for end. With the movement of the trundle head and trundles 72, the swing arm 73 is moved to a raised position. As the movement continues the doughnut is deposited ahead of the moving flight and, as the rising trundle approaches the top of its travel and starts over center the weighted arm 73 takes over from the flight which then clears the leg 70. This relationship is shown in FIG. 8B. The flipper arm 67 which is moving upwardly at this time under the action of the weighted arm and trundles contacts a moving flight on the lower run of the chain conveyor with said flight serving to momentarily halt the flipper arm as it moves across its surface. As soon as the flight on the lower run of the conveyor clears the flipper arm 67, the turner moves a slight remaining distance by the action of the weighted arm 73 and is finally held in the position shown in FIG. 8, ready for another turning cycle.

The drive unit 28 comprises a case 76 closed at the back by a gear box 77 in turn having a rear cover plate 78. An electric motor 80 is located in the base portion of the case proper and is carried by a swing plate 81 which is pivoted at its lower end to the front of the gear box 77 by a pin 82. The output shaft 83 of the motor 80 passes rearwardly through the swing plate 81 and through a cutout 84 in the gear box 77 to drive a pinion 85. Surmounting the latter is a gear 86 fixed on a forwardly projecting shaft 87 which is journaled in the case 76 above the motor 80. A tension spring 88 is anchored at one end to the case 76 and is hooked at its other end over a pin 89 at the top of the swing plate 81 to yieldingly pull the pinion 85 into mesh with the gear 86. By this arrangement, if the shaft 87 should become overloaded, the pinion 85 can back sufficiently out of mesh with the gear by swinging of the plate 81 in opposition to the spring 88 to permit the teeth of the pinion to pass the gear teeth. During this action the pinion teeth successively bang against the bottom stationary tooth of the gear as they pass so that the unit becomes a clacker, sounding a warning to the operator that the mechanism is jammed.

Since the electric motor 80 would otherwise tend to overheat during extended periods of operation, because of its confinement within the case 76, cooling and ventilation means are provided within the case 76 by a suitable electric fan unit 80a. In addition, ventilation ports 76a and 78a are provided in the case 76 and the plate 78 respectively. With this arrangement air is caused to circulate about the motor 80 and the interior of the case 76. It will be appreciated that the electric fan unit can be separately controlled by a manual switch, not shown, or may be a part of the motor circuit so as to insure operation during energization of the motor as a matter of choice.

A coupling plate 90, shown in detail in FIG. 15, with a radial peripheral slot 91 is fixed in the left end of the front shaft 44 for mating with a coupling plate 92 having an off-center projecting pin 93 adapted to extend into the slot 91. This latter coupling plate 92 is fixed on the forward end of the shaft 87. The other end of the front shaft 44 projects beyond the right cheek plate 42 and drives a crank plate 94 having its crank pin 95 journaled in the forward end of a connecting rod 96. At its rear end this rod is bent downwardly to provide a pintle 97 which extends into a journal formed at the free end of a lever 98 which is fixed on the column 35, as illustrated in FIGS. 1 and 3. With this arrangement the dough cutter 23 is swung from one side of the tank 21 to the other responsive to a half turn of the shafts 44 and 87. Thus when the connecting rod 96 is at its rearmost position (FIG. 3) the dough cutter overlies the right half of the tank and when the connecting rod reciprocates to its forwardmost position the dough cutter is positioned to discharge into the left half of the tank.

The dough cutter 23 may take a variety of forms such, for example, as shown in United States Patent No. 2,881,-716, and namely one in which a rod 100 is reciprocated in the hopper 41 and has a forming piston or mandrel 101 and a check valve unit 102–103 at its lower end operating in the necked cylindrical lower end portion 41a of the hopper. At the bottom the latter is a reduced dough discharge tube 104 fixed in an annular end plate 105. The check valve unit comprises a wheel-like component 102 fixed to the rod 100 and a disc-like component 103 floating on the rod between component 102 and the mandrel 101. During each cycle, as the rod moves in a down stroke carrying the valve component 102 and mandrel 101, it slides through the hub of the floating component 103 and a charge of dough is pulled from the hopper 41 into the neck 41a. This charge is isolated when the component 102 reaches the floating component 103 and thereby closes the check valve to isolate the neck from the hopper proper. After closure of the check valve 102–103, the mandrel 101 leaves the discharge tube 104 and further movement of the closed check valve extrudes the charge of dough past the mandrel. As the rod 100 then moves upward on its return stroke the mandrel re-enters the discharge tube 104, a dough ring is cut off, and the valve component 102 leaves the floating component 103. Further upward movement eventually brings the hub of the mandrel against the underside of the hub of the floating component and raises the latter. This upward movement of the floating component draws a new charge of dough from the hopper and through the openings in component 102. The mechanism is then ready for another dough dispensing-cutting cycle. In the present invention such a cycle occurs at each swing limit of the cutter 23.

Referring to FIG. 1, a bail 106 is secured on rim 40 of the hopper 41 and detachably mounted thereon is a motor housing 108 having a rear access cover 109 and a front boss 108a with depending legs 110 which have their feet secured to the bail by thumb screws 111. The bail 106 has a center boss 112 with a vertical through-bore slidably receiving an enlarged head on the upper end of the rod 100 and the front face of this boss is longitudinally slotted to provide an access-way for introducing the shank of the rod during assembly and for receiving a pintle at the lower end of a pitman 113. This pintle makes a pivotal connection between the pitman and the head of the rod 100. At its upper end the pitman has an adjustable-throw pivotal connection with a disc crank 114 located in the mouth of the boss 108a, all in the manner disclosed in Patent 2,881,716. This crank 114 is driven by a shaft 115 from a gear box 116 in the housing 108 giving speed reduction from the shaft 117 of a motor 118. The shaft 117 is journaled at the rear in a cross-head 120 which is held by a pair of screws 121–122 passing through the case of the motor 118 into the case of the gear box 116. This in turn is screw-connected to the housing 108.

Between the cross-head 120 and the motor 118 the shaft 117 has a disc 123 formed with a diametrically opposite pair of radial stop lugs 124 which are arranged to be engaged by a brake pawl 125. This pawl is swingably mounted on the shank of the screw 122 and is yieldingly urged toward braking position by a tension spring 126 which is connected to an ear 125a on the pawl and is anchored to an angle bracket 127 fixed on the motor case. To keep the braking pawl disengaged while the motor 118 is energized a dog 128 is provided having a depending finger 128a arranged to engage the top of the pawl as the dog swings downwardly about a pin 130 on the motor case. Downward swing of the dog is limited by a flange 128b at the top of the dog which is arranged to engage the upper face of the motor case. The motor 118 has a shading ring about one of its poles creating a magnetic pull on the dog 128 sufficient to counter the spring 126 and keep the pawl 125 pushed downwardly out of the path of rotation of the stop lugs 124. Thus, whenever the motor 118 is energized its shaft 117 is free to rotate. Then, whenever the running motor is de-energized the shaft 117 is stopped within half a turn by upward swing of the pawl 125 under force of the spring 126 into engagement with the next approaching of the stop lugs 124. Since the shaft 115 turns at reduced speed relative to the shaft 117 positive stopping of the latter within a half turn after deenergizing of the motor 118 assures that shaft 115 cannot overrun but a few degrees of rotation after the motor is turned off.

The electrical control circuit for the motor 118 includes two self-opening micro-switches 131 and 132, the first being mounted in the housing 108 and the other in the case 76. These switches 131–132 have followers 133–134 tracking on cams 135–136 which are mounted on the shafts 115 and 87, respectively. Cam 135 is generally circular and has a semi-circular cutout portion 135a causing the switch 131 to open once per revolution of the shaft 115, or in other words to open at the conclusion of each operation of the dough cutter. The shape of the cutout portion 135a allows the cam follower to make a decisive movement at the correct instant. On the other hand, cam 136 has a pair of diametrically opposite cutout portions 136a each, when engaged by the follower 134, causing the switch 132 to close with a quick action. The cutout portions 136a are located such that the dough cutter 23 is at one of its swing limits of travel each time the follower 134 reaches one of the cutout portions.

Figure 17:
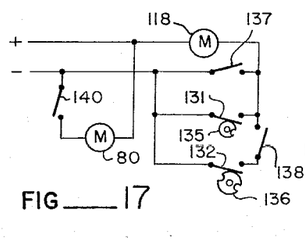
FIG. 17 is a schematic of the electrical control circuit for the fryer.

As indicated schematically in FIG. 17, the switches 131 and 132 are wired in respective parallel branches with the cutter motor 118. A third parallel branch contains a manual push button switch 137 located on the housing 108. The branch for switch 132 also contains a manual on-off switch 138 while the other motor 80 has its own power circuit controlled by a second manual on-off switch 140.

The heating assembly 22 comprises a thermostat housing 141 with a manual on-off switch 142 and temperature regulating knob 143. A hanger 144 at the bottom of the housing detachably supports the unit on the left side of the tank and then making several horizontal loops adjacent the bottom of the tank and beneath the level of the travel path of the lower course of the flight conveyor 25. The sensor 146 for the thermostat is clamped at 147 to one of the heating tube loops.

In forming the loops of the heating tube 145, it is important to locate the bulk of the tubing in the first half of the fryer tank 21, as illustrated clearly in FIG. 3. In the embodiment shown, three loops of the tube have been formed and located between the area of the shelf 63 and the turner 26. It has been found that the doughnuts are given a more even brownness on both sides when subjected to the greatest heat during the first half of the cooking process. Better control of the brownness and thoroughness of cooking is also achieved by this placement of the heating tube and sensor 146.

To operate the invention, first the thermostat switch 142 is turned on to heat the fat in the tank 21 up to frying temperature. In the meantime the hopper 41 is filled with dough and the cutter 23 is primed by depressing the push button 137 and holding it closed for a few cycles. When the fat is hot the switch 140 is closed to start the conveyors 25 and 27, and then switch 138 is closed. During each half-revolution of the shafts 87 and 44 the cutter 23 moves by action of the crank 94, connecting rod 96, and lever 98, to one of its two side limits of travel and at the same time the switch 132 is closed by action of the follower 134 in one of the cutout portions 136a. This completes a power circuit to the cutter motor 118 whereupon the shaft 115 is rotated a single revolution to cut and dispense a dough ring into the tank. Near the start of this revolution the shaft 115 rotates the cutout portion 135a from beneath the follower 133 whereupon the switch 131 is closed by action of the high part of the cam 135 on the follower. This occurs before the cutout portion 136a moves from beneath the follower 134 so that the power circuit for the cutter motor 118 moves without interruption from the branch which has the switches 132 and 138 to the branch containing the switch 131. At the close of the revolution of the shaft 115 the cutout portion 135a again moves beneath the follower 133 causing the switch 131 to open and shut off the cutter motor 118 which is then braked by action of the pawl 125 against one of the stop lugs 124 in the manner aforedescribed. During this action of the cutter 23 the conveyors remain in operation and so there is a slight swing movement of the cutter. However, it is negligible since the cutting-dispensing cycle can be only about one-half a second compared to a time increment between passage of successive flights of the conveyor 25 of about fifteen seconds. The timing of the machine is such that the crank 94 turns a revolution to move the cutter in the full swing cycle (from one side of the tank to the other and back) during the flight time increment so that two dough rings are dispensed in side by side relation between successive flights. The trailing of these flights then engages both dough rings to conduct them through the bath of fat. In this regard, when the dough rings first drop into the fat they sink, the depth of sinking being limited by the shelf 63. Since the heating tube loops are located beneath the level of the shelf 63, the hot fat flows upwardly through the slots 63a in the shelf and exerts a lateral force on the dough rings. The force of the hot flowing fat is sufficient to keep the dough rings separated and positioned on opposite sides of the shelf against their natural tendency to follow the motion of the cutter. At this point the flights 59 are beneath the surface of the fat so as to engage the sunken dough rings. Thereafter their rate of upward progress by way of the sloped rail portion 65a is made approximately the same as the rate of buoyancy increase of the dough rings responsive to the cooking action of the hot fat. In this manner the flights are kept in engagement with the doughnuts.

When the cooking dough rings reach the turner 26 they are engaged from beneath by one of the rotating flipper arms 67 and are gently turned end for end as they are conveyed along in the manner previously described for the operation of the turner. This turning action submerges the lesser cooked side of the dough rings so that by the time the dough rings reach the discharge end of the flight conveyor 25 they are substantially evenly cooked. They then float into engagement with the sloped upper course of the drain conveyor 27 and are carried thereby out of the fat and up the ramp 50 during which time they drain into the tank. At the top of the drain conveyor 27 the fried doughnuts drop onto the chute 52 and slide away from the fryer for packaging or other processing.

Figure 19:
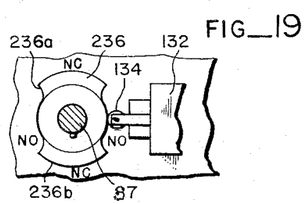
FIG. 19 is an alternate form cam actuated switch similar to the switch of FIG. 16, to be utilized with the control circuit of FIG. 18.

An alternate form of electrical control circuit, designed for cooperation with a modified form of the cam operated micro-switch carried by the power shaft 87, is illustrated in FIGS. 18 and 19 respectively. In the modified form only the shape of the cam 136 is changed with the modified form of the cam being designated by numeral 236 in FIG. 19. The modified cam 236 is mounted for rotation on the shaft 87 and cooperates with the cam follower 134 and micro-switch 132 in substantially the same manner as described for the cam 136 except for the motion imparted to the follower by the modified cam surface wherein the switch is normally opened by the recessed portions of the cam. It will be understood that the configuration and function of the cam 135, mounted on the shaft 115 of the cutter motor, FIG. 14, remains the same in the modified form of control circuit. In describing the modified form of control circuit shown in FIG. 18 like reference numerals are used to identify the identical elements referred to in the preferred embodiment of the invention.

Referring to FIG. 19, the cam 236 is formed with two identical oppositely positioned recesses 236a which hold the switch 132 in normally open position, and identical oppositely positioned cam lobes 236b which hold the switch 132 in normally closed position. The constantly rotating cam 236 thus operates to maintain the switch 132 in either normally open position or normally closed position, with the peripheral extent of the lobes 236b being equal to the extent of the recesses 236a so that the duration of the open condition of switch 132 is substantially equal to the duration of the closed condition.

The cams 236 and 135 are shown schematically in the circuit in FIG. 18 and cooperate with micro-switches 132 and 131 respectively as illustrated. In the modified circuit each of the switches 132 and 131 have normally open positions designated as NO and normally closed positions designated as NC with the NO contact of switch 132 being connected to the NC contact of switch 131 and the NC contact of switch 132 being connected to the NO contact of switch 131. The conveyor motor 80 is connected in the same manner as illustrated in the preferred embodiment with the manual switch 140 serving to control its actuation. A master override control for the circuit is provided by the double pole manual switch 237 which corresponds to the override switch 137 of the preferred embodiment. A second single pole manual switch 238 is provided between one lead from the power source and the cutter motor 118 and serves to break the circuit to motor 118 when the override switch 237 is open so as to prevent operation of the motor 118 by the action of the cam switches 131 and 132. The switch 238 corresponds in function to the switch 138 in the preferred embodiment.

Since at least one of the lines connecting the respective contacts of switches 132 and 131 will always be connected to one side of the power source, depending on the position of the cam 236, closing of the switch 237 will serve to bridge the two lines between switches 132 and 131 and thus pass current to one side of motor 118. Closing of switch 237 also bypasses switch 238 to complete the circuit through the motor 118 regardless of the position of switch 238. In this manner switch 237 acts as a priming control for the circuit, much in the manner described for the switch 137 of the preferred embodiment, to operate the device for a few cycles prior to the takeover of the cam switches.

Figure 14:
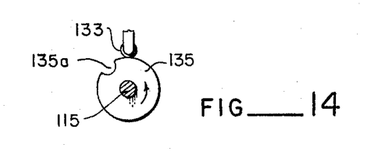
Figure 16:
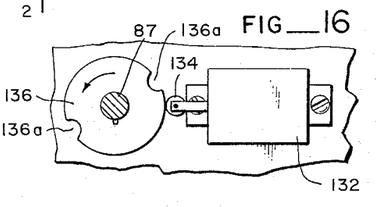
FIG. 16 is a detail sectional view taken on line 16—16 of FIG. 10.

The operation of the modified control circuit and cam switch will now be described with reference to FIGS. 14, 18 and 19. After the motor 80 has been started by closing the switch 140 and the circuit has been primed by closing the override switch 237 to operate the cutter mechanism for a few cycles, the switch 237 is again opened and the cam switches take over.

Due to the action of the braking device of the cutter motor 118 previously described, the cam 135 will always leave the micro-switch 131 in the NO or normally open position shown in FIG. 18 when the cutter motor stops. Starting the cycle from this position with the manual switch 238 closed, the cam 236 rotates until the follower 134 engages the lobe 236b on the cam. This action moves the follower 134 to cause the switch 132 to engage the NC contact which is connected to the NO contact of switch 131 and a circuit is completed to run the motor 118. The cutter motor 118 rotates the cam 135 and the follower 133 moves out of the cut-out portion 135a to move the switch 131 to the NC position. By this time the switch 132 has moved to the NO position by action of the follower 134 moving into the recess 236a on cam 236. Since the NO contact of switch 132 is connected to the NC contact of switch 131, the cutter motor 118 continues to rotate until the cam 135 has moved one revolution. At the end of one revolution of the cam 135 the follower 133 moves into the recess 135a and the switch 131 is moved to the NO position to break the upower circuit and stop the motor 118. When the switch 131 moves to the NO position, the follower 134 is still engaging the recess 236a of the cam 236 so that the switch 132 is also in the NO position. As soon as the cam again moves the switch 132 to the NC position the above cycle repeats. It will be noted that the timing of the rotation of the cam 236 and the extent of the recess 236a are sufficient to allow the cutter motor 118 to complete one revolution before starting another cycle.

With the embodiment of the control circuit just described, any chance of double dropping by continued operation of the cutter device, after motor 80 is deenergized is completely eliminated since, regardless of the stopping position of cam 236, the cam 135 will always stop the motor 118 after one revolution. To illustrate; if the cam 236 is stopped with the follower 134 anywhere along the lobe 236b, so as to leave the switch 132 in the NC position, and the switch 131 is in the NO position, the follower 133 will merely move out of the cut-out portion 135a a sufficient distance to move the switch 131 to the NC position, at which point the entire circuit is broken. Likewise, if the cam 236 is stopped with the follower 134 anywhere along the recess 236a, so as to leave the switch 132 in the NO position, and the switch 131 is in the NC position, the motor 118 will complete its revolution and the follower 133 will engage the recess 135a to move switch 131 to the NO position, at which time the entire circuit is broken.

It will be understood that the cooperation between the doughnut dropping cycles and the conveyor operation when utilizing the modified form of control circuit is the same as that described in conjunction with the preferred embodiment and hence is not repeated.

The frying machine of the present invention can be quickly disassembled in units for cleaning without the use of any tools. Plug fittings are used on the electrical connections for the cutter motor 118 and related control circuit. Accordingly, at any time dough cutter 23 can be easily electrically disconnected and lifted free of the column 35. The rear end of the connecting rod 96 can be disconnected simply by lifting the pintle 97 from the lever 98 and then the entire conveyor unit 24 is free to be lifted from the tank 21 and cocked to uncouple the pin 93 from the slot 91. Disassembly can then be completed merely by lifting the heater 22 from the tank, and in turn lifting the tank out of the base frame 20.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

We claim:

1. In combination with a tank with liquid therein, endless flight conveyor means in said tank having a lower course beneath the surface of said liquid and an upper course for moving bodies floating in said liquid along a given travel path in said tank the improvement which comprises, turner means between said courses for turning said bodies end for end comprising rotatable arms adapted to be alternately rotated by contact with advancing flights of said upper course upwardly through said upper course and downwardly through said lower course and momentarily halted by contact with advancing flights of said lower course, said rotatable arms having sufficient length to extend through said lower course and contact advancing flights of said lower course, and drain conveyor means sloping upwardly from said surface for moving said bodies out of said tank.

2. In combination, a tank, an endless flight conveyor in said tank having upper and lower courses, a shelf between said courses near the start of said upper course, and turner means between said shelf and the finish of said upper course comprising rotatable arms adapted to be alternately rotated by contact with advancing flights of said upper course upwardly through said upper course and downwardly through said lower course and momentarily halted by contact with advancing flights of said lower course, said rotatable arms having sufficient length to extend through said lower course and contact advancing flights of said lower course.

3. In combination, a tank, an endless flight conveyor in said tank having upper and lower courses, a shelf between said courses near the start of said upper course, said upper course having a sloping portion overlying said shelf with its lower end nearest said start and having a horizontal portion between the upper end of said sloping portion and the finish of said upper course, and turner means between said horizontal portion and said lower course comprising rotatable arms adapted to be alternately rotated by contact with advancing flights of said upper course upwardly through said upper course and downwardly through said lower course and momentarily halted by contact with advancing flights of said lower course, said rotatable arms having sufficient length to extend through said lower course and contact advancing flights of said lower course.

4. In combination with a tank assembly, a drive unit mounted on said tank assembly and having an output shaft, the improvement comprising a pair of cheek members detachably carried on said tank assembly extending into and upwardly above said tank, an endless flight conveyor positioned within said tank and carried by and between said cheek members, an endless drain conveyor carried by and between said cheek members, one end to be fed from said flight conveyor and the other end extending outwardly of said tank, a rotary drive shaft mounted on said cheek members, means for driving said conveyors from said drive shaft, and coupling means for detachably connecting said output shaft with said drive shaft.

5. The combination of claim 4 in which said flight conveyor has upper and lower courses, and a shelf is mounted on said cheek members and extends between said courses.

6. The combination of claim 4 in which said drain conveyor has upper and lower courses, and a ramp is mounted on said cheek members and extends closely beneath said upper course of the drain conveyor.

7. The combination of claim 4 in which said flight conveyor has upper and lower courses, and rotary turner means journal-mounted on said cheek members and extending between said courses for turning over bodies pushed by the flights of said upper course.

8. The combination of claim 7 in which said turner means successively meshes with the flights of said upper course and has a rotary shaft with a trundle-head mounted thereon and presenting a plurality of circumferentially spaced trundles, and a weighted swing arm pivotally mounted on said one cheek member and successively resting on said trundles, said swing arm being raised when one of said upper course flights is in mesh with said turner means and lowering when said turner means is out of mesh with said upper course flights to thereby aid in rotating said turner means.

9. The combination according to claim 8 wherein said turner means includes diametrically opposed flipper arms mounted on said rotary shaft, and angled leg portions carried by each of said flipper arms closely adjacent said shaft for successively meshing with the flights of said upper course.

10. The combination according to claim 9 wherein said flipper arms are removably mounted on said rotary shaft and said shaft comprises first and second shaft sections removably journaled in said cheek members.

11. The combination of claim 4 in which said conveyors have respective upper and lower courses, the upper course of said drain conveyor sloping upwardly out of said tank away from said flight conveyor, a shelf carried by said cheek members and extending between the courses of said flight conveyor adjacent the end thereof remote from said drain conveyor, rotary turning means journal-mounted on said cheek members and extending between the courses of the flight conveyor endwise of said shelf in the direction of said drain conveyor for turning over bodies pushed by the flights of the upper course of the flight conveyor toward the drain conveyor, and a ramp carried by said cheek members and closely underlying the upper course of said drain conveyor.

12. The combination of claim 4 in which said drain conveyor has an upper course sloping upwardly out of said tank assembly away from said flight conveyor, and a chute carried by said cheek members endwise of said tank assembly for discharging from the upper end of said drain conveyor.

13. In combination with a tank assembly, a drive unit mounted on said tank assembly and having an output shaft, in which an upright support is carried by and journaled for turning movement relative to said tank assembly, a dough cutter detachably mounted on said upright support for swinging above said flight conveyor responsive to turning of said upright support, a horizontal lever fixed on said upright support, a crank on said drive shaft, and a connecting rod pivotally connected at its ends to said crank and lever, whereby said dough cutter is swing-oscillated responsive to turning of said drive shaft, the improvement comprising a pair of cheek members within said tank, an endless drain conveyor carried flight conveyor carried by and between said cheek members within said tank, an endless drain conveyor carried by and between said cheek members to be fed from said flight conveyor, a rotary drive shaft mounted on said cheek members, means for driving said conveyors from said drive shaft, and coupling means for detachably connecting said output shaft with said drive shaft.

14. The combination of claim 13 in which a dough cutting assembly is detachably swing-mounted on said tank assembly and presents a horizontal lever, a crank in a vertical plane operatively associated with said drive shaft, and a connecting rod pivotally connected at one end to said crank and detachably pivotally connected at its other end to said lever, whereby said dough cutter is swing-oscillated responsive to turning of said drive shaft.

15. The combination of claim 4 in which a heating assembly is detachably mounted on said tank assembly and has a heating tube extending downwardly between one of said cheek members and the adjacent portion of said tank assembly and horizontally between said conveyors and the bottom of the tank assembly.

16. The combination according to claim 15 wherein said endless conveyor has an upper and lower course, and the horizontal portion of said heating element includes a plurality of loops concentrated at the beginning of said upper course whereby articles carried by said conveyor are subjected to the greatest heat near the beginning of said upper course.

17. The combination of claim 4 in which turner means is journal-mounted between said cheek members and is operatively associated with energy storing means carried by one of said cheek members, said turner means being arranged to be successively engaged by the flights of said flight conveyor and moved each time through a given arc in opposition to said energy storing means whereby said energy storing means moves the turner means beyond said arc by thereafter releasing energy which was stored during the respective opposition so that the turner means will advance into proper position to be engaged by the next flight.

References Cited by the Examiner

UNITED STATES PATENTS

| | | | |
|---|---|---|---|
| 1,686,596 | 10/1928 | Betz | 99—405 X |
| 1,737,363 | 11/1929 | Ehrhart | 99—405 |
| 1,776,781 | 9/1930 | Carpenter | 99—405 X |
| 2,286,013 | 6/1942 | Roth | 99—405 |
| 2,397,777 | 8/1946 | Colman | 74—399 X |
| 2,543,403 | 2/1951 | Duval | 99—409 |
| 2,685,249 | 8/1954 | Badger | 99—403 |
| 2,709,955 | 6/1955 | Hunter | 99—404 |
| 2,735,357 | 2/1956 | Gagnon | 99—409 |
| 2,833,203 | 5/1958 | Benson et al. | 99—404 |
| 2,867,162 | 1/1959 | Hunter et al. | 99—354 |
| 2,881,716 | 4/1959 | Belshaw | 107—14 |
| 2,917,008 | 12/1959 | Kipnis | 99—354 X |
| 2,966,840 | 1/1961 | Forsyth | 99—354 |

CHARLES A. WILLMUTH, *Primary Examiner.*

LAWRENCE CHARLES, ROBERT E. PULFREY,
*Examiners.*

W. A. VANSANTEN, S. E. BECK, *Assistant Examiners.*